United States Patent
Martin et al.

(10) Patent No.: US 8,086,674 B2
(45) Date of Patent: Dec. 27, 2011

(54) ATTACHMENT SERVER NETWORK FOR VIEWING ATTACHMENTS ON A PORTABLE ELECTRONIC DEVICE

(75) Inventors: Daryl Martin, Toronto (CA); Ahmed E. Hassan, Waterloo (CA); Connor Patrick O'Rourke, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 734 days.

(21) Appl. No.: 11/766,158

(22) Filed: Jun. 21, 2007

(65) Prior Publication Data

US 2008/0320103 A1 Dec. 25, 2008

(51) Int. Cl.
*G06F 15/16* (2006.01)
(52) U.S. Cl. .................................... 709/206
(58) Field of Classification Search ................... 709/206
See application file for complete search history.

(56) References Cited

U.S. PATENT DOCUMENTS

| | | | |
|---|---|---|---|
| 5,475,819 A * | 12/1995 | Miller et al. | 709/203 |
| 6,341,311 B1 * | 1/2002 | Smith et al. | 709/226 |
| 6,374,292 B1 * | 4/2002 | Srivastava et al. | 709/206 |
| 6,600,814 B1 * | 7/2003 | Carter et al. | 709/206 |
| 6,834,301 B1 * | 12/2004 | Hanchett | 709/223 |
| 2002/0026560 A1 * | 2/2002 | Jordan et al. | 711/120 |
| 2002/0065892 A1 * | 5/2002 | Malik | 709/206 |
| 2002/0133537 A1 * | 9/2002 | Lau et al. | 709/219 |
| 2003/0028647 A1 | 2/2003 | Grosu | |
| 2003/0208546 A1 * | 11/2003 | DeSalvo et al. | 709/206 |
| 2004/0010543 A1 * | 1/2004 | Grobman | 709/206 |
| 2004/0268358 A1 * | 12/2004 | Darling et al. | 718/105 |
| 2006/0133340 A1 | 6/2006 | Rybak | |
| 2009/0276364 A1 * | 11/2009 | Iaia et al. | 705/80 |

FOREIGN PATENT DOCUMENTS

EP 1708098 A 10/2006

OTHER PUBLICATIONS

Wikipedia Cache Array Pouting Protocol, printed Aug. 30, 2009.*
Wikipedia Internet Cache Protocol, printed Aug. 30, 2009.*

* cited by examiner

*Primary Examiner* — Ajay Bhatia
(74) *Attorney, Agent, or Firm* — Stephen J. Perry; T. Andrew Currier; Perry+Currier Inc.

(57) ABSTRACT

An attachment server network including at least two attachment servers in communication with one another, each of the attachment servers for converting email attachments in response to view requests received from portable electronic devices, each of the attachment servers having a respective cache for storing data corresponding to previously converted attachments, the data being available to any of the attachment servers in the attachment server network.

13 Claims, 7 Drawing Sheets

ATTACHMENT SERVER NETWORK FOR VIEWING ATTACHMENTS ON A PORTABLE ELECTRONIC DEVICE

FIELD

The present disclosure relates to a method for viewing an attachment on a portable electronic device, in particular, a method for viewing an attachment using an attachment server network.

BACKGROUND

It is becoming increasingly popular to send photographs, scanned documents, slide shows, PDF documents and other types of attachments in email messages. Each attachment is provided with a filename and is linked to an email message in a manner that is well known in the art. Often, a single email message may contain multiple attachments as well as multiple recipients.

Attachments that are received by portable electronic devices are typically converted into a device-readable format at a server before being sent to the device for display. The length of the conversion process varies depending on the size and complexity of the attachment as well as the load on the server. It is therefore desirable to reduce the processing time in order to minimize the delay experienced by the device user when opening an attachment.

BRIEF DESCRIPTION OF THE DRAWINGS

The embodiments will be better understood with reference to the following Figures in which like numerals denote like parts and in which.

DETAILED DESCRIPTION

As discussed in greater detail below, according to one aspect of this specification there is set forth a method for viewing an attachment of an email message on a portable electronic device, the method including: sending a view request from a portable electronic device to one of a plurality of attachment servers in an attachment server network; performing a search on each attachment server in the attachment server network to locate a converted attachment corresponding to the attachment of the email message; and upon locating the converted attachment, sending the converted attachment to the portable electronic device for display by the attachment viewer.

In another aspect there is set forth an attachment server network including at least two attachment servers in communication with one another, each of the attachment servers for converting email attachments in response to view requests received from portable electronic devices, each of the attachment servers having a respective cache for storing data corresponding to previously converted attachments, the data being available to any of the attachment servers in the attachment server network.

Figure 1:
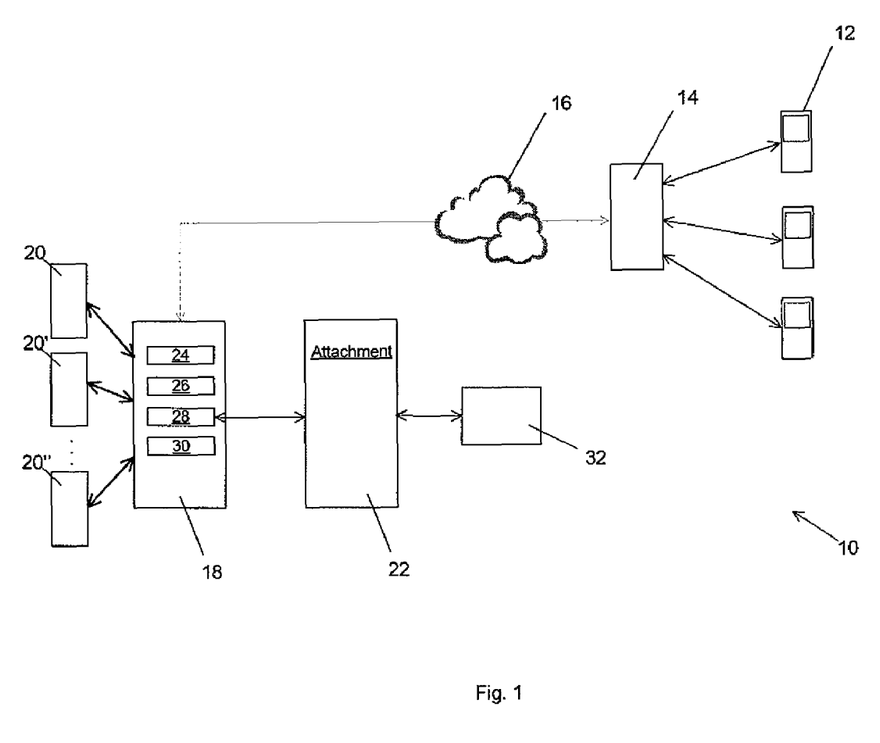
FIG. 1 is a schematic diagram of a wireless communication system.

Referring now to FIG. 1, a communication system 10 for a portable electronic device 12 is generally shown. The portable electronic device 12 is operable to effect communications over a radio communications channel and communicates with a base station (not shown) while located within a coverage area that is defined by the base station. The base station is part of a wireless network that is in communication with the Internet 16. Data is delivered to the portable electronic device 12 via wireless transmission from the base station. Similarly, data is sent from the portable electronic device 12 via wireless transmission to the base station.

It will be appreciated that the portable electronic device 12 is movable within the coverage area and can be moved to coverage areas defined by other base stations. A relay 14 is provided to route data, such as email messages, for example, between the Internet 16 and the current base station of the portable electronic device 12. Further, as will be understood by one of ordinary skill in the art, wireless networks include GSM/GPRS, CDPD, TDMA, iDEN, Mobitex, DataTAC networks, EDGE, EVDO or UMTS and broadband networks such as Bluetooth and variants of 802.11.

A server 18 handles wireless client requests from the portable electronic device 12. A firewall or a proxy server (not shown) is provided between the server 18 and the Internet 16. The server 18 includes a router 24, a dispatcher 26, an agent 28 and an attachment server process 30.

A mail server 22 communicates with the server 18 to exchange emails with an email client 32 such as Microsoft Outlook™. The agent 28 sends compressed copies of emails received at the mail server 22 to the portable electronic device 12 via the dispatcher 26, the router 24 and the relay 14. Typically multiple email clients 32 communicate with the mail server 22. Emails originating from the email clients are stored at the mail server 22 before being compressed at server 18 and sent out over the internet. Similarly, emails received from the internet are transmitted to the email clients 32 via the server 18 and the mail server 22.

Figure 2:
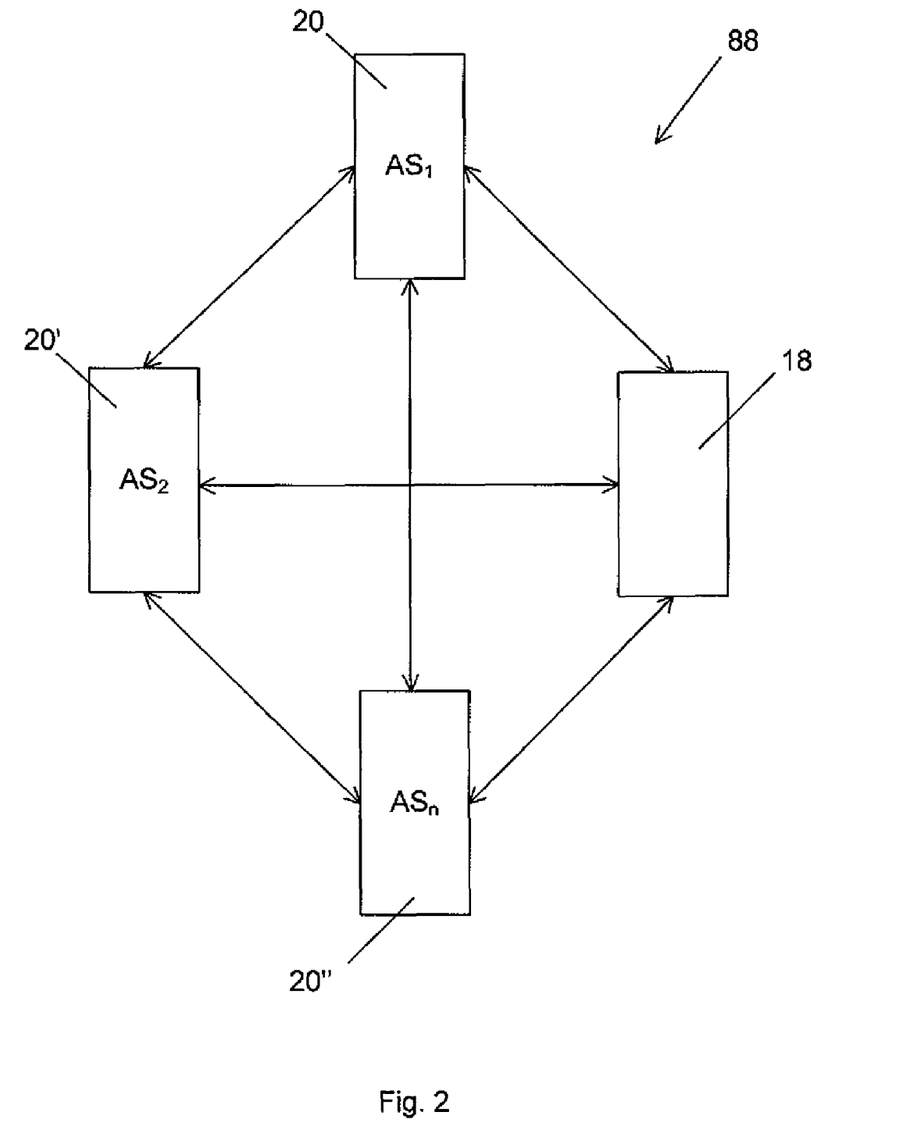
FIG. 2 is a schematic diagram showing communication between servers of the wireless communication system of FIG. 1.

The server 18 uses attachment server process 30 to process attachment data from the mail server 22 (e.g. documents, spreadsheets, presentations, etc.). Additional attachment server processes 20, 20' and 20" may reside on additional servers in communication with the attachment server process 30 and with one another to create an attachment server network 88, which is shown in FIG. 2. It will be appreciated that any number of attachment server processes (hereinafter referred to as attachment servers) may be provided, the number is selected based on the number of portable electronic device users communicating with the server 18.

It will be appreciated by a person skilled in the art that although server 18 is described as including an attachment server, it may alternatively be limited to non-attachment server functions but in communication with one or more attachment servers for processing attachment data.

Figure 3:
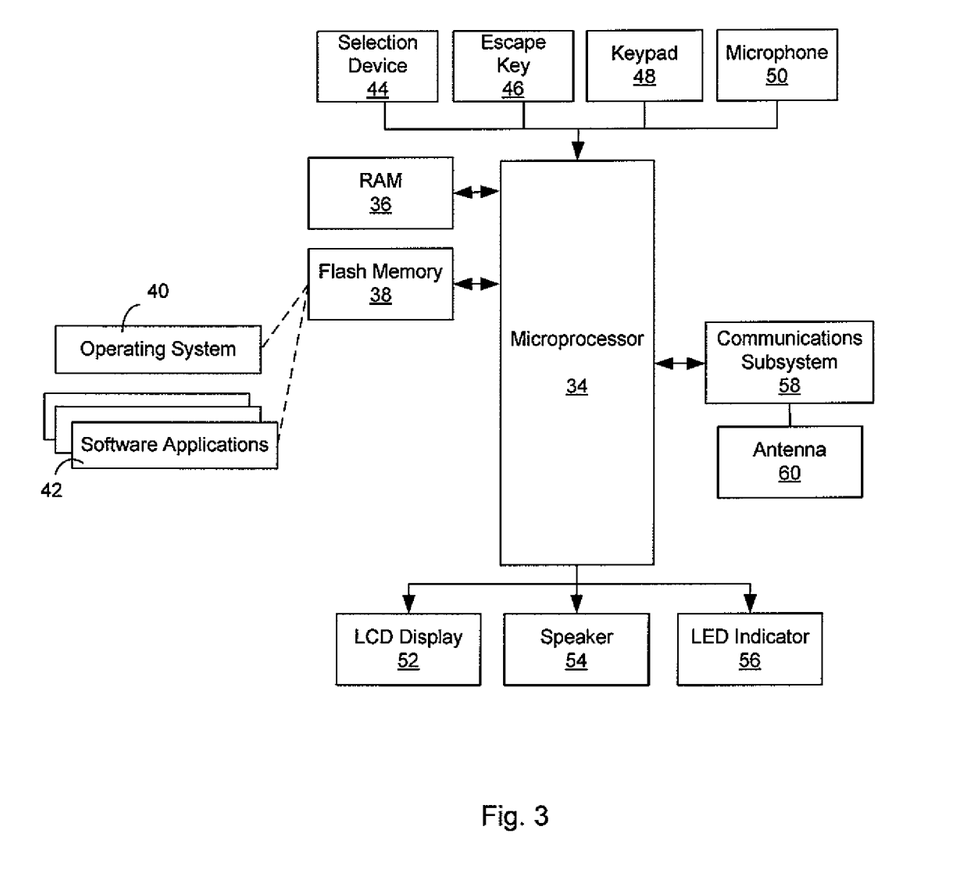
FIG. 3 is a block diagram of components of a portable electronic device according to an embodiment.

Referring now to FIG. 3, a block diagram of certain components, including internal components within the portable electronic device 12, is shown. The portable electronic device 12 is based on a microcomputer that includes a microprocessor 34 connected to a random access memory (RAM) unit 36 and a persistent storage device, which in the present embodiment is a flash memory 38 that is responsible for various non-volatile storage functions of the portable electronic device 12. Operating system software 40 executable by the microprocessor 34 is stored in the flash memory 38. It will be appreciated, however, that the operating system software 40 can be stored in other types of memory such as read-only memory (ROM). In the present embodiment, software applications 42 including Personal Information Manager (PIM) applications are stored in the persistent storage device 38 for execution by the microprocessor 34 for carrying out various functions. The microprocessor 34 receives input from various input devices including a selection device 44 such as a thumbwheel or trackball, for example, an escape key 46, a keypad 48 and a microphone 50 and outputs to various output devices including an LCD display 52, a speaker 54 and an LED indicator 56.

As indicated above, the flash memory 38 stores a plurality of applications executable by the microprocessor 34 that enable the portable electronic device 12 to perform certain operations including the communication operations referred to above. Applications software is provided including, for example, PIM applications such as an email application, an address book application, a calendar application, a tasks application and an attachment viewer application, as well as other applications such as a Web browser application, an options application and a profiles application.

In a data communication mode, a received signal such as a text message or Web page download is processed by the communications subsystem 58 and input to the microprocessor 34 for further processing of the received signal for output to the LCD display 52. A user of the portable electronic device 12 can also compose data items within a software application such as an e-mail messaging application using the keypad 48, for example, in conjunction with the selection device 44 and the LCD display 52. Such composed items can then be transmitted over the communications network through the communications subsystem 58 and antenna 60.

Request/view functionality for an attachment of an email message received by the portable electronic device 12 is provided by the attachment viewer application and the attachment servers. The attachment viewer application, which is executed by the microprocessor 34 of the portable electronic device 12, communicates with the attachment servers 30, 20, 20', 20" to display transcoded/compressed attachment data that corresponds to email attachments. The attachment data may be a document converted to plain text, an audio file compressed to mp3 or an image with reduced quality, for example.

In the present embodiment, the portable electronic device 12 is based on the computing environment and functionality of a wireless personal digital assistant (PDA). It will be understood, however, that the portable electronic device 12 is not limited to wireless personal digital assistants. Other portable electronic devices are possible, such as smart telephones, and laptop computers.

Figure 4:
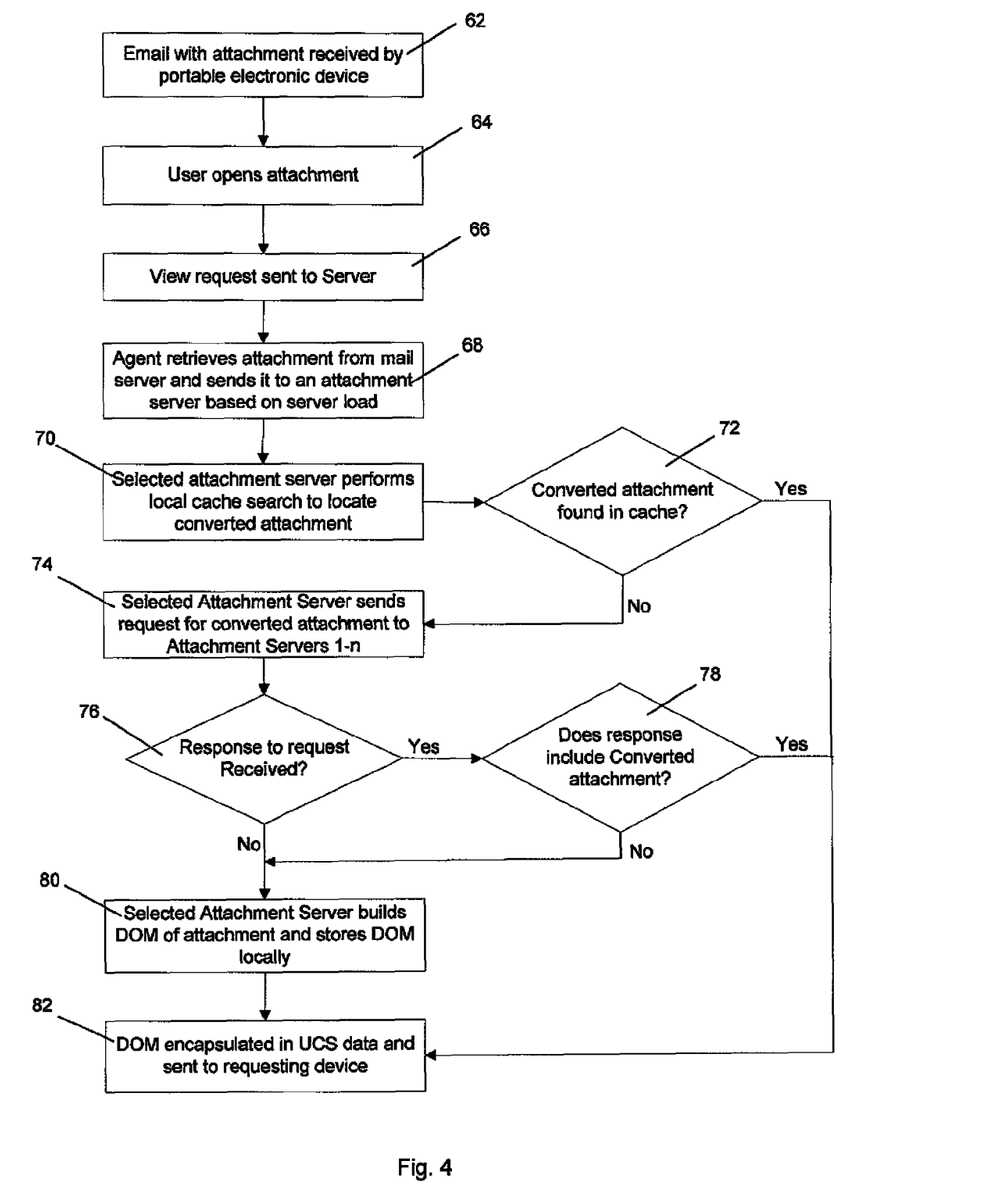
FIG. 4 is a flowchart depicting a method of viewing an attachment of an email message.

Referring to FIG. 4, a method for viewing an attachment on the portable electronic device 12 is generally shown. At steps 62 and 64, an email including an attachment is received by the portable electronic device 12 and the attachment is selected and opened by a user. A view request is then sent from the portable electronic device 12 to the server 18, as indicated at step 66. The view request may originate at the attachment viewer, a home screen of the device 12 or a window of the email application. The view request typically includes a screen size (height/width) of the portable electronic device 12, a color depth, such as 8 bit, 16 bit or 32 bit, for example, a version tag indicating device attachment viewer capabilities such as what file types the attachment viewer is able to receive and display, for example, and the maximum chunk size of data.

At step 68, the agent 28 receives the view request, preferably retrieves the attachment from the mail server 22 and forwards the attachment to one of the attachment servers 30, 20, 20', 20" in the attachment server network 88. The agent 28 determines which attachment server 30, 20, 20', 20" to send the attachment to based on server load. Alternatively, the attachment server 30, 20, 20', 20", etc., may fetch attachment data from a local or remote mail store.

Figure 5:
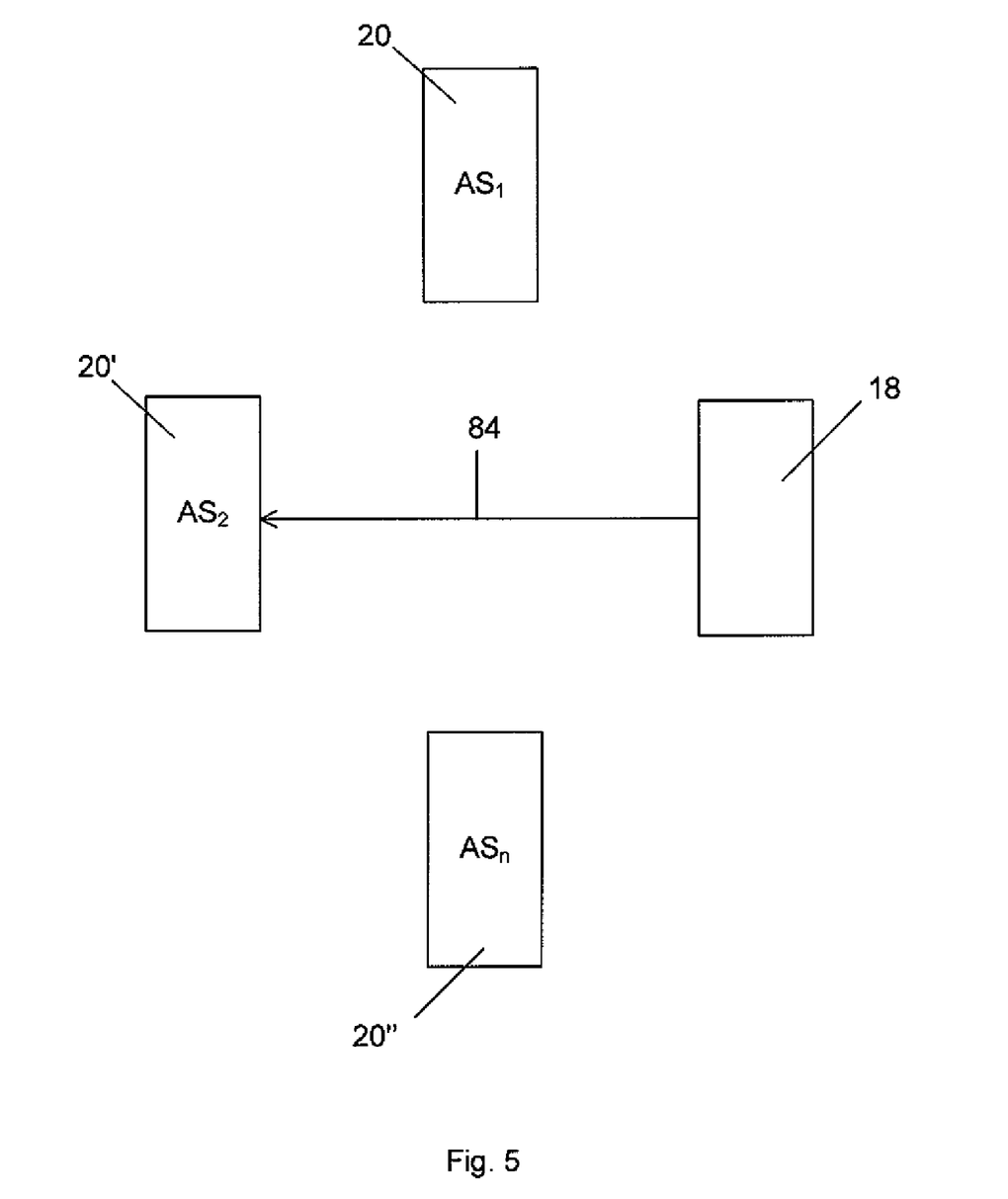
FIGS. 5 and 6 are schematic diagrams showing communication between servers of the wireless communication system of FIG. 1.

In this exemplary embodiment, the view request is routed to the attachment server 20', as indicated by arrow 84 in FIG. 5. Once the attachment server 20' selected, the attachment server 20' performs a search of its local cache in order to locate a converted attachment corresponding to the email attachment, as indicated at steps 70 and 72. The search is performed using a checksum or other information for identifying the attachment, such as creation date, modification date, md 5 sums, attributes, etc. A filename of the attachment may also be provided, although it is not necessary that the filename be identical to that of the attachment in the local cache. If a converted attachment is found in the local cache, the DOM (Document Object Model) of the converted attachment is encapsulated in attachment viewer-readable UCS (Universal Content Stream) data and sent to the attachment viewer, as indicated at step 82. Details of DOM creation and encapsulation of attachment data in UCS is known in the art and described, for example, in United States Patent Publication No. US2002/0161796, the contents of which are incorporated herein by reference.

Figure 6:
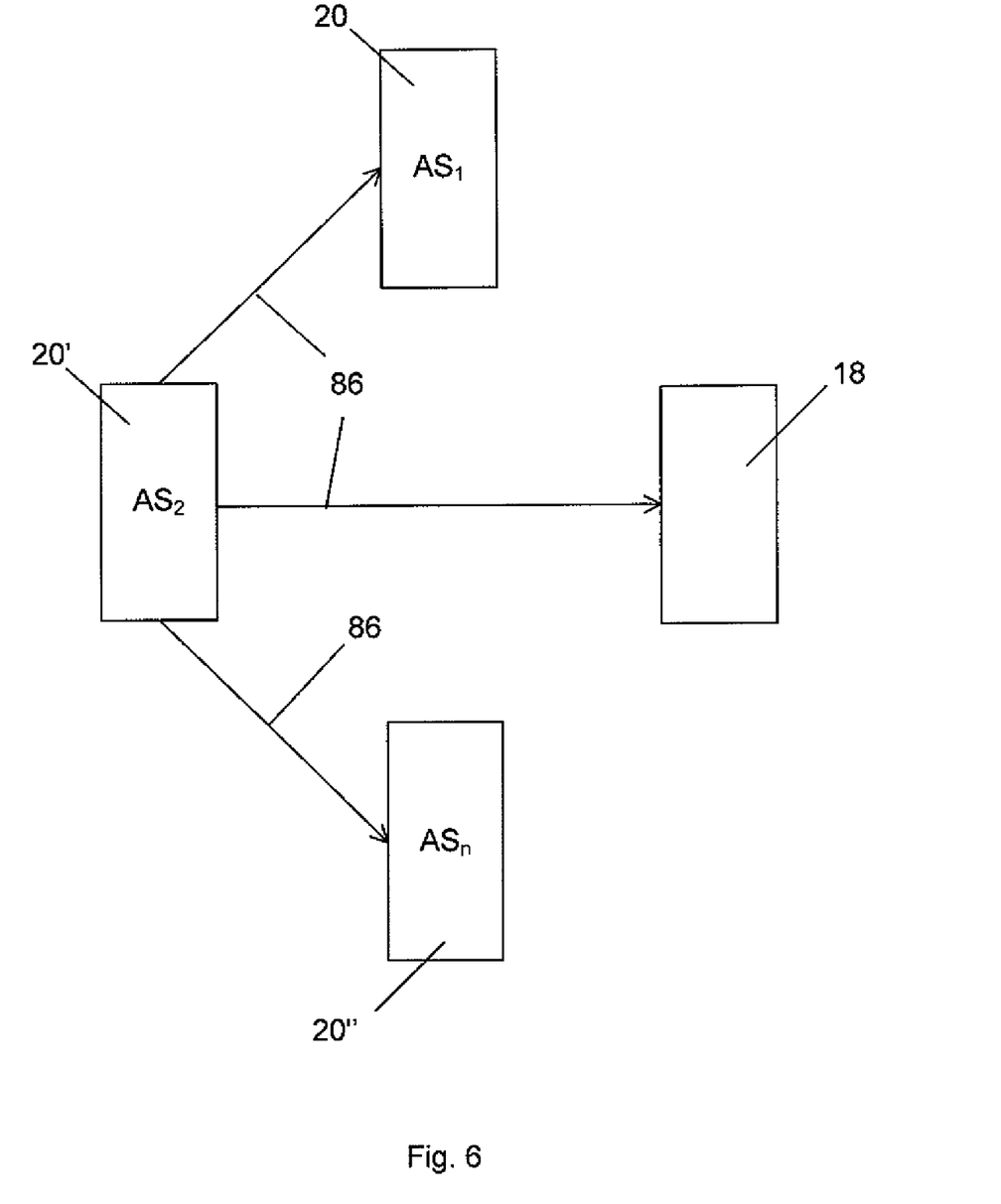

At step 74, following an unsuccessful local cache search, the selected attachment server 20' sends a search request directly to the other attachment servers 30, 20, 20", as indicated by arrows 86 in FIG. 6. The search request is sent in order to determine if the attachment has been previously converted at a different attachment server 30, 20, 20". The search request includes a checksum or other information for identifying the attachment, and may also include a filename of the attachment.

The attachment server 20' then waits for a response to the search request from the other attachment servers 30, 20, 20", as indicated at step 76. If a response is received, the attachment server 20' determines if the received response includes a DOM (Document Object Model) corresponding to a converted attachment, at step 78. If so, the DOM is encapsulated in UCS data and sent to the attachment viewer, as indicated at step 82. If no response to the search request is received, or if the response does not include a DOM corresponding to the converted attachment, the attachment server builds a DOM of the attachment and stores the DOM locally, as indicated at step 80. Once the DOM has been created, the DOM is encapsulated in attachment viewer-readable UCS data and sent to the attachment viewer, as indicated at step 82.

DOM structure is well known and is disclosed in United States Patent Application Nos. 2002/0161796 and 2006/0055693, which are herein incorporated by reference. In general, an Attachment Server 18 builds a DOM by parsing the attachment document to generate a graph structure representing a map of the original attachment file. The DOM contains textual content, font, style and formatting attributes as well as layout attributes, such as page/slide size, positioning information (ie. x, y and z coordinates on the page), embedded graphics and tables, for example.

According to an alternative embodiment, the attachment server that receives the request from agent 28 as a result of step 68 (e.g. attachment server 20') transmits a unique ID to the mobile device 12 following execution of step 72. If the converted attachment is found in the cache of attachment server 20' (a "YES" at step 72), the unique ID is used to associate future requests from the device 12 with attachment server 20'. If the converted attachment is not found in the cache of attachment server 20' (a "NO" at step 72), the attachment server 20' may attach a unique ID of another attachment server (e.g. server 20, 20", etc.) for ensuring that the next request from device 12 goes to the other attachment server. According to this embodiment, the unique ID causes the attachment server in the original request to "point" the device 12 to the attachment server whose cache is likely to contain the converted attachment. This minimizes scanning across the network of attachment servers and also decreases the latency time at the device 12, from the perspective of the user.

Figure 7:
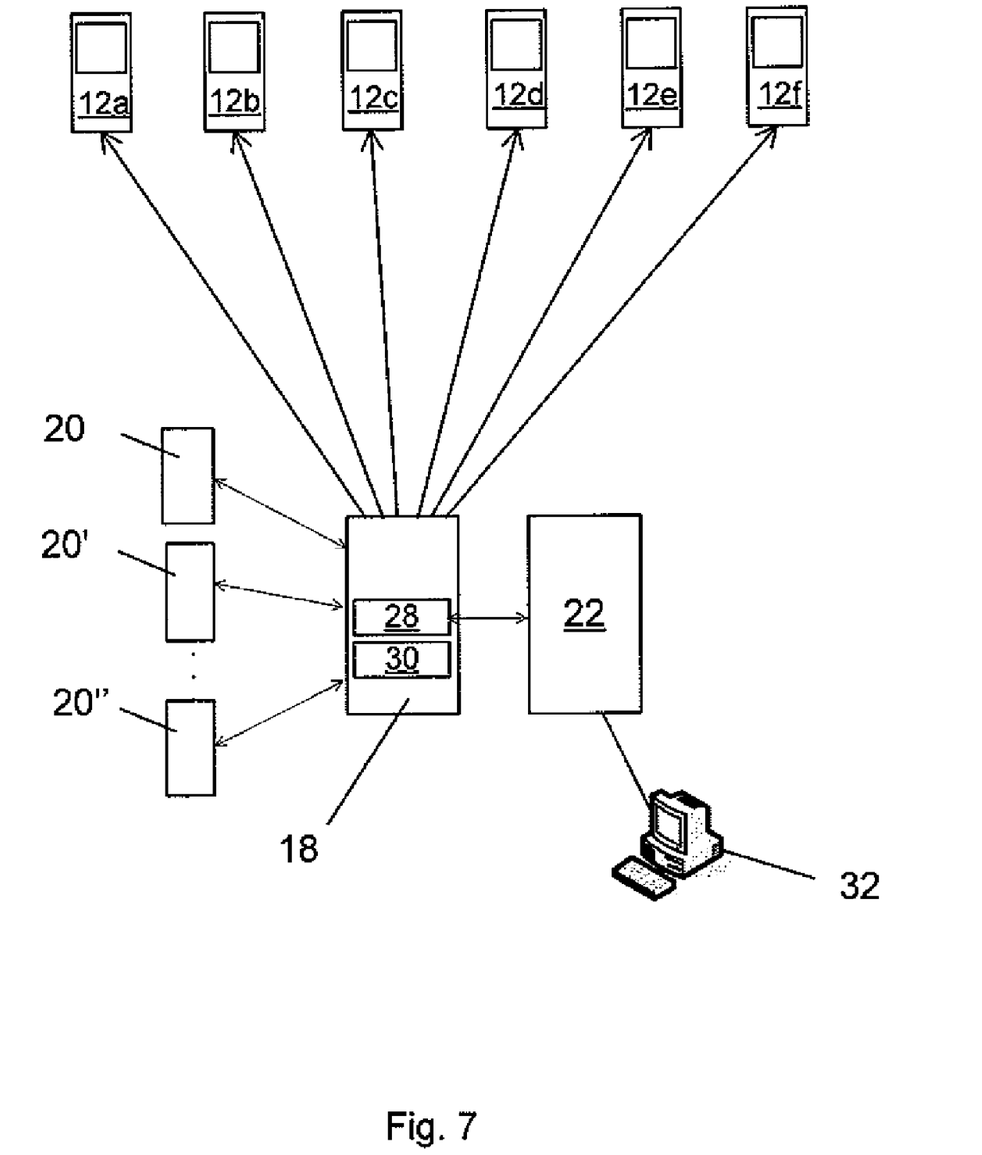
FIG. 7 is a schematic diagram showing an exemplary embodiment of the method of FIG. 4.

The method for viewing an attachment on portable electronic device 12 will now be described with reference to the example of FIG. 7. In this example, an email is generated at an email client 32. The email includes a document from the Human Resources Department that is sent to every employee in a company regarding a change to the benefits package. Once sent, the email travels to the mail server 22 and is distributed to each email address. For employees having portable electronic devices, the agent 28 locates the emails on the mail server 22 and sends the emails to the corresponding portable electronic devices.

Upon receiving the email including the attachment at portable electronic device 12a, the user opens the attachment and a view request is sent to the agent 28. In response to the view request, the agent retrieves the attachment from the mail server 22 and sends it to the attachment server having the most processing availability of all of the servers in the attachment server network. Since the other attachment servers are determined to have a higher processing load at the time the request is received, the attachment is sent to attachment server 20. Since portable electronic device 12a is the first of the portable electronic devices to request to view the attachment, a local search and a search of the other attachment servers to locate a corresponding converted attachment are both unsuccessful. The attachment server 20 then builds a DOM of the attachment and stores the DOM locally. The DOM is then encapsulated in UCS data and sent to the portable electronic device 12a. The user of device 12a is then able to view the attachment.

Later, the user of portable electronic device 12c opens the email including the attachment and a view request is sent to the agent 28. Again the agent 28 retrieves the email from the mail server 22 or other mail store and sends the attachment to the server having the most processing availability, such as attachment server 30. Once attachment server 30 receives the attachment, a local search is performed in order to locate the corresponding converted attachment. Since the attachment was previously converted on attachment server 20, the search is unsuccessful. Search requests are then forwarded to the other attachment servers in the attachment server network 88. Unsuccessful responses are received from attachment servers 20' and 20". The response from attachment server 20 is successful and includes the DOM of the converted attachment. The DOM is then encapsulated in UCS data and sent to the portable electronic device 12c and the user of device 12c is able to view the attachment.

A similar process will occur for the subsequent view requests for the same attachment from other portable electronic devices 12b, 12d, 12e, 12f so that the conversion and transcoding process is only performed once. Since the conversion process consumes significant CPU power to process the meta-data and render images, reducing the process to a single instance therefore reduces processing time, reduces the delay experienced by users waiting to view an attachment and allows more users to be added to a single server 18.

It will be appreciated by a person skilled in the art that if the device types of the portable electronic devices is not the same, the conversion process would have to be performed once per device type.

In another embodiment, each attachment server in the attachment server network 88 broadcasts or otherwise sends notifications to each other attachment server in response to changes in cache information. The caches of the servers in the network are therefore continuously updated so that each attachment server will have a generally identical cache. In such an embodiment only a local search for converted attachments is performed following a view request. If no corresponding converted attachment is found locally, the attachment will be converted and the DOM sent to the other servers in the attachment server network 88. Then, if a different attachment server receives a subsequent view request for the previously converted attachment, the DOM will be retrieved from the local cache of that attachment server. Parameters, such as a maximum cache size and from which servers cache updates are received, for example, would be configurable.

In another embodiment, all of the attachment servers in the network 88 update a central cache accessible to all servers.

In yet another embodiment, the attachment servers of the attachment server network 88 are periodically synchronized with one another. In this embodiment, rather than sending search requests across the attachment server network 88 or sending notifications including new cache information, the attachment servers in the network 88 are synchronized at regular intervals to copy cache information to one another. The length of the intervals would be determined based on server load such that, for example, if the server load is high then cache updates may be delayed until such time as the server load permits It will be appreciated by a person skilled in the art that the view request, the search request and any other communication between the attachment servers 18, 20, 20' and 20" may be performed using TCP (Transmission Control Protocol) or UDP (User Datagram Protocol).

Although the converted attachment has been described herein as being a DOM, it will be appreciated by a person skilled in the art that any over the air optimization may be used. For example, an optimization that sends only a small chunk of transcoded text instead of a full document or an optimization that sends a well compressed image.

Specific embodiments have been shown and described herein. However, modifications and variations may occur to those skilled in the art. All such modifications and variations are believed to be within the sphere and scope of the present embodiments.

What is claimed is:

1. A method for enabling an attachment of an email message to be viewed on a portable electronic device, said method comprising:

receiving a view request from a portable electronic device at one of a plurality of attachment servers in an attachment server network, each of said attachment servers having access to a respective cache for storing data corresponding to previously converted attachments, said data being available to any of said attachment servers in said attachment server network;

performing a search of the respective cache of said one or other of said attachment servers in said attachment server network based on server load to locate a converted attachment corresponding to said attachment of said email message, wherein said search of the respective cache of said other of said attachment servers is performed remotely on said other of said attachment servers in response to a search request being sent from said one attachment server, said request identifying said attachment of said email message; and upon locating said converted attachment, sending said converted attachment to said portable electronic device for display by said attachment viewer.

2. A method as claimed in claim 1, wherein said search is performed locally on said one attachment server prior to performing said search on other attachment servers in said attachment server network.

3. A method as claimed in claim 1, wherein said search is performed remotely following an unsuccessful local search on said one attachment server.

4. A method as claimed in claim 1, wherein said converted attachment data is encapsulated in a device-readable format prior to being sent to said portable electronic device.

5. A method as claimed in claim 1, wherein said attachment is identified in said search by a checksum.

6. A method as claimed in claim 1, wherein said one attachment server transmits a unique ID to said portable electronic device identifying a predetermined one of said plurality of attachment servers to receive further view requests from said portable electronic device.

7. A method as claimed in claim 6, wherein said unique ID identifies said one attachment server.

8. A method as claimed in claim 6, wherein said unique ID identifies another of said plurality of attachment servers.

9. An attachment server network including at least two attachment servers in communication with one another, each of said attachment servers for converting email attachments in response to view requests received from portable electronic devices, each of said attachment servers having access to a respective cache for storing data corresponding to previously converted attachments, said data being available to any of said attachment servers in said attachment server network, and a first one of said attachment servers being selected to search its respective cache for said data corresponding to previously converted attachments based on server load.

10. An attachment server network as claimed in claim 9, wherein data stored in the respective cache of a first attachment server is available to a second attachment server in response to a search request being sent from said second attachment server to said first attachment server.

11. An attachment server network as claimed in claim 10, wherein said search request includes a checksum to identify said attachment.

12. An attachment server network as claimed in claim 9, the respective cache in each attachment server in said attachment server network is synchronized at regular intervals with the respective cache in each other attachment server in said attachment server network to provide generally identical data on said respective cache of each attachment server in said attachment server network.

13. An attachment server network as claimed in claim 9, wherein responsive to generation of new cache data in one attachment server, said cache data is sent to other attachment servers of said attachment server network for storage in said respective cache of each of said other attachment servers.

* * * * *